United States Patent
Hochman et al.

(10) Patent No.: US 11,570,163 B2
(45) Date of Patent: Jan. 31, 2023

(54) USER AUTHENTICATION SYSTEM

(71) Applicant: UNS PROJECT INC., Berkeley, CA (US)

(72) Inventors: Jonathan Hochman, West Hartford, CT (US); Jonah Stein, Berkeley, CA (US); John Cunningham, West Hartford, CT (US)

(73) Assignee: UNS PROJECT INC., Berkeley, CA (US)

( * ) Notice: Subject to any disclaimer, the term of this patent is extended or adjusted under 35 U.S.C. 154(b) by 248 days.

(21) Appl. No.: 16/856,213

(22) Filed: Apr. 23, 2020

(65) Prior Publication Data

US 2020/0344224 A1 Oct. 29, 2020

Related U.S. Application Data (60) Provisional application No. 62/838,215, filed on Apr. 24, 2019.

(51) Int. Cl.
*H04L 29/06* (2006.01)
*H04L 9/40* (2022.01)

(52) U.S. Cl.
CPC ...... *H04L 63/0807* (2013.01); *H04L 63/0815* (2013.01); *H04L 63/0853* (2013.01); *H04L 63/0861* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,475,146 B2* | 1/2009 | Bazot | ............... | H04L 63/0815 709/227 |
| 10,015,171 B1* | 7/2018 | Vardy | ............... | H04L 63/102 |
| 2008/0059804 A1* | 3/2008 | Shah | ............... | H04L 63/0884 726/8 |
| 2011/0202988 A1* | 8/2011 | Otranen | ............... | H04L 67/42 726/8 |
| 2013/0290360 A1* | 10/2013 | Cunningham | ....... | G06F 21/00 707/E17.014 |
| 2014/0215565 A1* | 7/2014 | Miyoshi | ............ | H04L 67/563 726/3 |

(Continued)

FOREIGN PATENT DOCUMENTS

| | | | | |
|---|---|---|---|---|
| WO | 2018111302 A1 | 6/2018 | | |
| WO | WO-2018111302 A1 * | 6/2018 | ............. | G06F 21/32 |

OTHER PUBLICATIONS

Luke Walker, "FIDO2 Functional Overview", Yubico (Year: 2018).*
International Search Report For Serial No. PCT/US20/29469 dated Jul. 15, 2020.

*Primary Examiner* — Piotr Poltorak
(74) *Attorney, Agent, or Firm* — McCormick, Paulding & Huber PLLC (57) ABSTRACT

A user authentication system and method includes a network of guardian nodes and gatekeeper nodes configured to securely communicate with one another. The gatekeeper nodes are connected to service providers and the guardian nodes are associated with UAS customers. The guardian nodes and gatekeeper nodes are configured to generate tokens that are passed between the guardian nodes, gatekeeper nodes, service providers and UAS customers to authenticate UAS customers requesting access to service providers.

40 Claims, 3 Drawing Sheets

(56) References Cited

U.S. PATENT DOCUMENTS

2016/0164868 A1* 6/2016 Cunningham ........ H04L 9/3271
  726/7
2017/0017936 A1* 1/2017 Bisikalo ............... G06Q 20/308
2017/0264597 A1* 9/2017 Pizot ...................... H04L 67/02
2018/0232526 A1* 8/2018 Reid ..................... H04L 9/3213

* cited by examiner

USER AUTHENTICATION SYSTEM

CROSS-REFERENCE TO RELATED APPLICATIONS

This application claims priority to U.S. Provisional Patent Application No. 62/838,215 filed Apr. 24, 2019, which is hereby incorporated by reference herein in its entirety.

TECHNICAL FIELD

The present application is related to systems and methods for authenticating user identity. More particularly, the present application is directed to systems and methods for providing universal authentication of users across system boundaries.

BACKGROUND

Typically, online service providers build, support and/or manage their own user authentication functionality for providing online services to users. As a result, users have to use different authentication methods and manage different information (e.g., usernames, passwords, etc.) to access online services provided by different service providers. Accordingly, there is a need for a system that provides universal authentication of users for different online services across system boundaries.

Additionally, existing systems are subject to predictable failures. For example, password-based authentication systems run the risk that the passwords can be stolen from the user's device or the online service to which the password grants access. This becomes a major problem because most users re-use the same passwords for numerous services where they have accounts.

Systems with more advanced security, such as those based on single use passwords or tokens sent via text message or generated by an authenticator application (also known as $2^{nd}$ factor authentication) create a distinct set of problems themselves. For instance, when a user has accounts with many services, each might require a different $2^{nd}$ factor authentication protocol. This can be an extreme burden on the user because it requires the user to keep track of all the different ways they need to authenticate with different services. Additionally, if a user loses their device or changes their phone number, the authentication protocols may no longer work. Resetting them for a plurality of services can be a difficult or insurmountable burden.

Existing systems are also vulnerable to Sybil attacks, where bad actors create multiple accounts with a service and uses the multiple accounts for anti-social activities, such as posting fake reviews, vote stacking, or repeated violation of service policies, including even criminal activity.

SUMMARY

The present disclosure overcomes the deficiencies of known authentication systems by providing a User Authentication System (UAS) configured to provide customer authentication for different online service providers across system boundaries. In one embodiment, the UAS comprises a network of guardian nodes and gatekeeper nodes configured to securely communicate with one another. The gatekeeper nodes are connected to service providers and receive requests for UAS customers to access online services managed by the service providers. The gatekeeper nodes then generate tokens for UAS customers requesting access to online services. The tokens are sent to the services for which access is being requested, and the services then send the tokens to the requesting customers, who, in turn, send them to their guardian nodes. The guardian nodes receive the tokens from the customers, authenticate the UAS customers and generate reply messages indicating whether the UAS customers requesting access to the online services have been successfully authenticated. The gatekeeper nodes receive the tokens back from the guardian nodes and the reply messages indicating whether the UAS customers requesting access to online services have been successfully authenticated. The gatekeeper nodes then send the service providers account information regarding successfully authenticated UAS customers who have requested access to online services.

In another embodiment of the UAS, the gatekeeper nodes are connected to service providers and receive tokens associated with requests for UAS customers to access online services managed by the service providers. The gatekeeper nodes then send the tokens to the guardian nodes corresponding to the UAS customers requesting access. The guardian nodes receive the tokens, authenticate the UAS customers and generate reply messages indicating whether the UAS customers requesting access to online services have been successfully authenticated. The gatekeeper nodes receive the tokens back and the reply messages indicating whether the UAS customers requesting access to online services have been successfully authenticated. The gatekeeper nodes then send the service providers account information regarding successfully authenticated UAS customers who have requested access to online services.

In some embodiments of the UAS, each UAS customer has a registered UAS customer account maintained and stored at a guardian node.

In some embodiments of the UAS, each UAS customer account includes user account keys corresponding to different online services associated with a UAS customer.

In some embodiments of the UAS, each user account key corresponding to an online service associated with a UAS customer includes a unique number and a network address of a gatekeeper node corresponding to the online service.

In some embodiments of the UAS, the guardian nodes authenticate UAS customers using an authentication method selected from the group consisting of multifactor authentication (MFA), Public Key Infrastructure (PKI), biometric authentication and WebAuthn.

In some embodiments of the UAS, each service provider has a registered UAS provider account maintained and stored at a gatekeeper node.

In some embodiments of the UAS, each UAS provider account includes service account keys corresponding to different UAS customers who access an online service managed by the service provider.

In some embodiments of the UAS, each service account key corresponding to a UAS customer includes a unique number and a username.

In some embodiments of the UAS, the UAS further comprises an executive node configured to securely communicate with the guardian nodes and gatekeeper nodes. The executive node stores public keys, and the guardian nodes and gatekeeper nodes store private keys. The public keys and private keys are used for secure communication among the executive node, guardian nodes and gatekeeper nodes.

In some embodiments of the UAS, the executive node includes a table of authentic guardian nodes and gatekeeper nodes in the UAS, which includes the network addresses of the authentic guardian nodes and gatekeeper nodes, the UAS customers associated with each guardian node and the online services associated with each gatekeeper node. The executive node publishes the table of authentic nodes to each authentic node so that the nodes can communicate with each other and verify each other's identities.

Also, provided is a method of providing user authentication across system boundaries. In one embodiment, a gatekeeper node receives a request for a UAS customer to access an online service managed by a service provider and the gatekeeper node generates a token for the UAS customer request to access the online service. The token is forwarded to the service from the gatekeeper, and then to the customer who digitally signs it. A guardian node associated with the customer then receives the token and authenticates the UAS customer. The guardian node generates a reply message indicating whether the UAS customer has been successfully authenticated. The gatekeeper node receives the token and the reply message indicating whether the UAS customer has been successfully authenticated from the guardian node. The gatekeeper node then sends the service provider account information for the successfully authenticated UAS customer who has requested access to the online service.

In another embodiment of the method, a gatekeeper node receives a token associated with a request for a UAS customer to access an online service managed by a service provider and the gatekeeper node sends the token to a guardian node corresponding to the UAS customer requesting access. The guardian node receives the token and authenticates the UAS customer. The guardian node generates a reply message indicating whether the UAS customer has been successfully authenticated. The gatekeeper node receives the token and the reply message indicating whether the UAS customer has been successfully authenticated from the guardian node. The gatekeeper node sends the service provider account information for the successfully authenticated UAS customer who has requested access to the online service.

In some embodiments of the method, the guardian node registers and stores a UAS customer account for the UAS customer.

In some embodiments of the method, the UAS customer account includes a user account key corresponding to the UAS customer and the requested online service.

In some embodiments of the method, the user account key associated with a UAS customer includes a unique number and a network address of the gatekeeper node corresponding to the online service.

In some embodiments of the method, the guardian node authenticates the UAS customer using an authentication method selected from the group consisting of multifactor authentication (MFA), Public Key Infrastructure (PKI), biometric authentication and WebAuthn.

In some embodiments of the method, the gatekeeper node registers and stores a UAS provider account for the service provider.

In some embodiments of the method, the UAS provider account includes a service account key corresponding to the UAS customer and the requested online service.

In some embodiments of the method, the service account key includes a unique number and a username.

In some embodiments of the method, an executive node securely communicates with the guardian nodes and gatekeeper nodes. The executive node stores public keys, and the guardian nodes and gatekeeper nodes store private keys. The executive node, guardian nodes and gatekeeper nodes use the public keys and private keys for securely communicating with each other.

In some embodiments of the method, the executive node stores a table including the network address of the guardian node associated with the UAS customer and the gatekeeper node associated with the online service.

In some embodiments of the method, a token from a guardian node indicating that a UAS user has been successfully authenticated may be passed from a receiving gatekeeper node to a first service and then on to a second service. In this way the user can prove their identity to the first service and allow the first service to share information about the user with the second service.

In some embodiments of the method, the gatekeeper node may be configured to share with the guardian node tokenized versions of users' public keys, allowing gatekeeper nodes to detect if a particular user has created multiple accounts with a service because multiple accounts created and/or controlled by the same user are often used maliciously. Tokenization is a process of hashing a first piece of data so that the recipient, in this case the guardian node, can tell if that first piece of data was the same as a second piece of data without actually knowing either the first or second piece of data. Hashing is a one-way encryption function that does not allow the result to be decrypted.

In some embodiments of the UAS, the users' devices may maintain a data structure, such as a Merkle tree or the like, containing the users' public keys. When the user digitally signs a token, the user appends an indicator of their set of public keys, such as the root hash of the Merkle tree containing their keys. This confirms all of the user's valid keys.

In some embodiments of the invention the guardian nodes also maintain a data structure for each user containing that user's public keys.

In some embodiments of the invention the guardian nodes and the gatekeeper nodes save the tokens from prior authentication transactions and present them to the user for verification. In this way the user can detect if a guardian node or gatekeeper node has performed an incorrect authentication.

BRIEF DESCRIPTION OF THE DRAWINGS

The foregoing summary, as well as the following detailed description, is better understood when read in conjunction with the appended drawings. For the purpose of illustrating the invention, exemplary embodiments are shown in the drawings, it being understood, however, that the present application is not limited to the specific embodiments disclosed. In the drawings.

DETAILED DESCRIPTION

Before the various embodiments are described in further detail, it is to be understood that the invention is not limited to the particular embodiments described. It will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. It is also to be understood that the terminology used is for the purpose of describing particular embodiments only, and is not intended to limit the scope of the claims of the present application.

Figure 1:
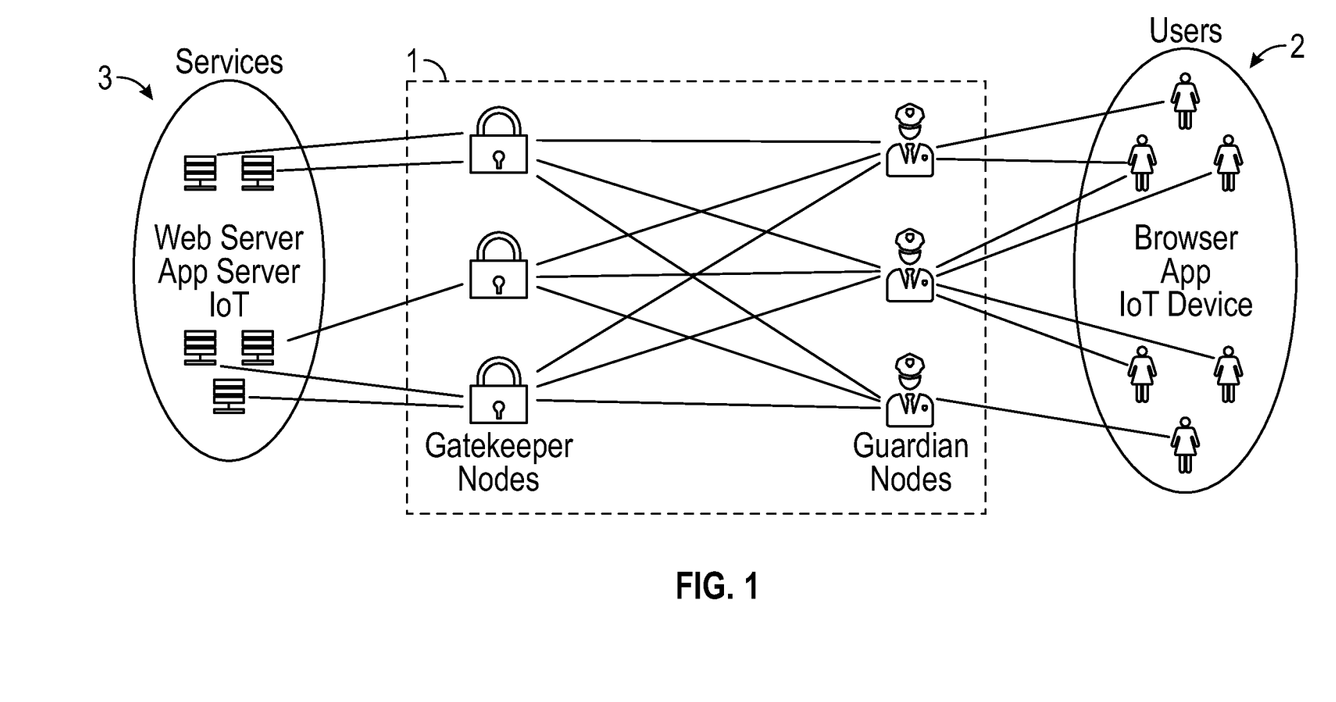
FIG. 1 is a diagram of an exemplary User Authentication System (UAS)
Figure 2:
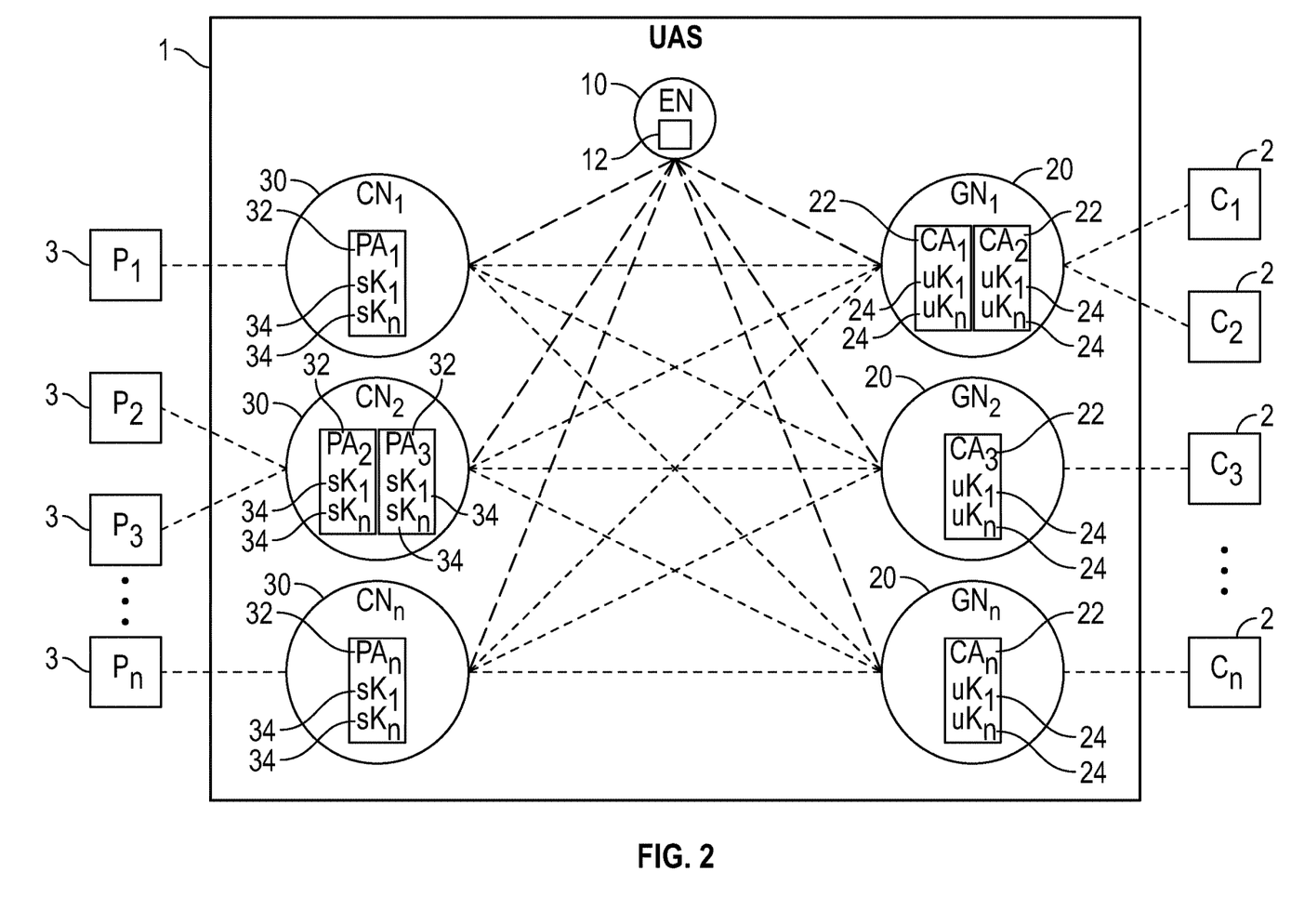
FIG. 2 is another diagram of the of the exemplary UAS of FIG. 1.

As shown in FIGS. 1 and 2, provided is a User Authentication System (UAS) 1 configured to provide authentication of customers 2 ($C_1$, $C_2$, $C_3$ ... $C_n$) for different online service providers 3 ($P_1$, $P_2$, $P_3$ ... $P_n$) across system boundaries. Each customer 2 may be an individual, agent or team, which accesses one or more internet services that require authentication for access. Service providers 3 provide such internet services (e.g., retail, media, financial, government, data management, etc.) with an obligation to secure their own systems and customer information of subscribing customers 2. UAS 1 may be connected to customers 2 and service providers 3 to provide authentication of customers 2 who are trying to access online services provided by the service providers 3 via network connections on computing devices (e.g., smartphones, computers, laptops, etc.).

Typically, online service providers 3 build, support and/or manage their own user authentication functionality for providing customers 2 access to online services. Different service providers 3 may employ different authentication methods for granting customers 2 access to online services. For example, some service providers 3 may use a username and password to authenticate a customer 2 and grant access to said customer 2, while other service providers 3 may use two-factor authentication or some other authentication technique to authenticate a customer 2 and grant access to said customer 2.

UAS 1 may provide an alternative means of authentication for participating customers 2 and service providers 3. Customers 2 and service providers 3 may register with UAS 1 to make use of the authentication functionality provided by UAS 1. Accordingly, participating customers 2 may use UAS 1 to access online services across system boundaries provided by different participating service providers 3. Also, participating service providers 3 may offload the authentication functionality to UAS 1 and mitigate the risks associated with user authentication.

UAS 1 is a decentralized authentication system for securing user identities on the Internet, which eliminates a single point of failure. UAS 1 operates as shared infrastructure, replacing individual login screens. UAS 1 enables secure user authentication for sensitive transactions on all platforms (e.g., websites, native apps, the Internet of Things (IoT), etc.). UAS 1 preserves user privacy by avoiding the use of email addresses, phone numbers and personally identifiable information in the login process. UAS 1 also saves developers the trouble of creating and maintaining user login systems, while providing a consistent, high-quality user experience.

The UAS 1 includes all of the necessary electronics, software, memory, storage, databases, firmware, logic/state machines, processors, microprocessors, servers, communication links, and any other input/output interfaces to perform the functions described herein and/or to achieve the results described herein. For example, the UAS 1 may include, or be in communication with, one or more processors and memory, which may include system memory, including random access memory (RAM) and read-only memory (ROM). Suitable computer program code may be provided to the UAS 1 for executing numerous functions, including those discussed herein in connection with providing user authentication.

The one or more processors and/or microprocessors may be in communication with the memory, which may store any data and/or information typically found in computing devices, including an operating system, and/or one or more other programs (e.g., computer program code and/or a computer program product) that are stored in a non-transitory memory portion and adapted to direct the UAS 1 to perform according to the various embodiments discussed herein. Embodiments of the present invention are not limited to any specific combination of hardware and software.

The computer program code may be provided on a suitable computer-readable medium, which as used herein, refers to any medium that provides or participates in providing instructions and/or data to the UAS 1 for execution. Such computer-readable medium may take many forms, including but not limited to, non-volatile media or memory and volatile memory. Non-volatile memory may include, for example, optical, magnetic, or opto-magnetic disks, or other non-transitory memory. Volatile memory may include dynamic random access memory (DRAM), which typically constitutes the main memory or other transitory memory.

Referring to FIG. 2, UAS 1 operates as a highly cohesive, but loosely coupled, set of network nodes, including a single Executive Node 10, Guardian Nodes 20 ($GN_1$, $GN_2$ ... $GN_n$) and Gatekeeper Nodes 30 ($CN_1$, $CN_2$ ... $CN_n$), each implemented on its own server or cluster of servers. Customer identity data of customers 2 is partitioned between Guardian Nodes 20 and Gatekeeper Nodes 30 to protect privacy. Executive Node 10, Guardian Node 20 and Gatekeeper Node 30 may each be implemented in a centralized, decentralized or distributed computing system. An implementer (e.g., an individual or organization) builds and deploys a licensed instance of the UAS 1. The implementer stands up UAS 1—the network of Guardian Nodes 20 and Gatekeeper Nodes 30 that are managed by the Executive Node 10. Node operators (e.g., individuals or organizations) build and deploy licensed instances of one or more Guardian Nodes 20 and/or Gatekeeper Nodes 30. Guardian Nodes 20 and Gatekeeper Nodes 30 may be located in different countries, preserving the rights of customers 2 and service providers 3 in different jurisdictions.

Executive Node 10 is the entry point for system management of UAS 1. The primary function of Executive Node 10 is to maintain a table 12 of authentic Guardian Nodes 20 and Gatekeeper Nodes 30, including a network location (e.g., network address) and public key for each Guardian Node 20 and Gatekeeper Node 30. The Executive Node 10 periodically distributes this table 12 to each Guardian Node 20 and Gatekeeper Node 30, enabling the Guardian Nodes 20 and Gatekeeper Nodes 30 to securely communicate with one another.

Guardian Nodes 20 interface with customers 2 on the network for authentication. For example, customers 2 may access Guardian Nodes 20 via browser applications on Internet of Things (IoT) devices. A customer 2 accesses a Guardian Node 20 to create a UAS customer account 22 ($CA_1$, $CA_2$, $CA_3$ ... $CA_n$). Customers 2 may select Guardian Nodes 20 of their choice that they trust. This selection may be based on a variety of factors including price, reputation, jurisdiction of the Guardian Node 20, availability of the Guardian Node 20 in the Customer's location, liability guarantees provided by the Guardian Node 20 for security breaches, and/or any other similar commercial terms or factors of interest to the Customer 2. Customers 2 log in to their UAS customer accounts 22 at their selected Guardian Nodes 20 via a selected authentication method including cryptographic and/or biometric protocols. For initial identity verification, the customer 2 may provide basic contact information (e.g., email, phone, etc.) and choose a method of authentication and provide necessary details (e.g., authenticator app seed value). Importantly, Guardian Nodes 20 are not required to store any Personally Identifiable Information (PII) (e.g., full name, Social Security number, driver's license number, bank account number, passport number, etc.) in UAS customer accounts 22. Once a customer's 2 identity is verified when the UAS customer account 22 is created, subsequent customer 2 authentication is carried out using a selected authentication method (e.g., multifactor authentication (MFA), Public Key Infrastructure (PKI), biometric authentication, WebAuthn, etc.) that does not require PII.

UAS customer account 22 may include information regarding the level security of the authentication method used in connection with the UAS customer account 22 and information regarding the amount of indemnity coverage in effect for the UAS customer account 22. The implementer of UAS 1 establishes the amount of indemnity coverage based on the level of security provided by the authentication method used. Also, the UAS customer account 22 for a customer 2 may include user account keys 24 ($uK_1 \ldots uK_n$) corresponding to different online services accessed by said customer 2 that are provided by participating service providers 3. Each user account key 24 corresponds to a specific online service and includes a unique number and a network address of the Gatekeeper Node 30 corresponding to the online service.

A participating service provider 3 may implement UAS 1 for authentication functionality by accessing a Gatekeeper Node 30. Gatekeeper Nodes 30 interface with service providers 3 to provide authentication functionality for granting authenticated customers 2 access to online services. For example, service providers 3 may access Gatekeeper Nodes 30 via web server applications on Internet of Things (IoT) servers. Participating service providers 3 are provided UAS provider accounts 32 ($PA_1$, $PA_2$, $PA_3$ . . . $PA_n$) that are maintained and stored at one or more selected Gatekeeper Nodes 30. Service Providers 3 may select Gatekeeper Nodes 30 of their choice that they trust. Like with the Guardian Nodes 20, the selection of Gatekeeper Nodes 30 may be based on a variety of factors including price, reputation of the Gatekeeper Nodes 30, jurisdiction of the Gatekeeper Nodes 30, availability of the Gatekeeper Nodes 30 in the service provider's location, liability guarantees provided by the Gatekeeper Nodes 30 for security breaches, and/or any other similar commercial terms or factors of interest to the service provider 3. Each UAS provider account 32 may include service account keys 34 ($sK_1 \ldots sK_n$) corresponding to different customers 2 who access an online service managed by a specific service provider 3. Each service account key 34 corresponding to a customer 2 includes a unique number and a username associated with the online service managed by the specific service provider 3. The unique number in the service account key 34 associated with the online service and customer 2 is the same unique number in the user account key 24 associated with the same online service and customer 2. Thus, the unique number links the user account key 24 and service account key 34 associated with the same online service and customer 2.

Figure 3:
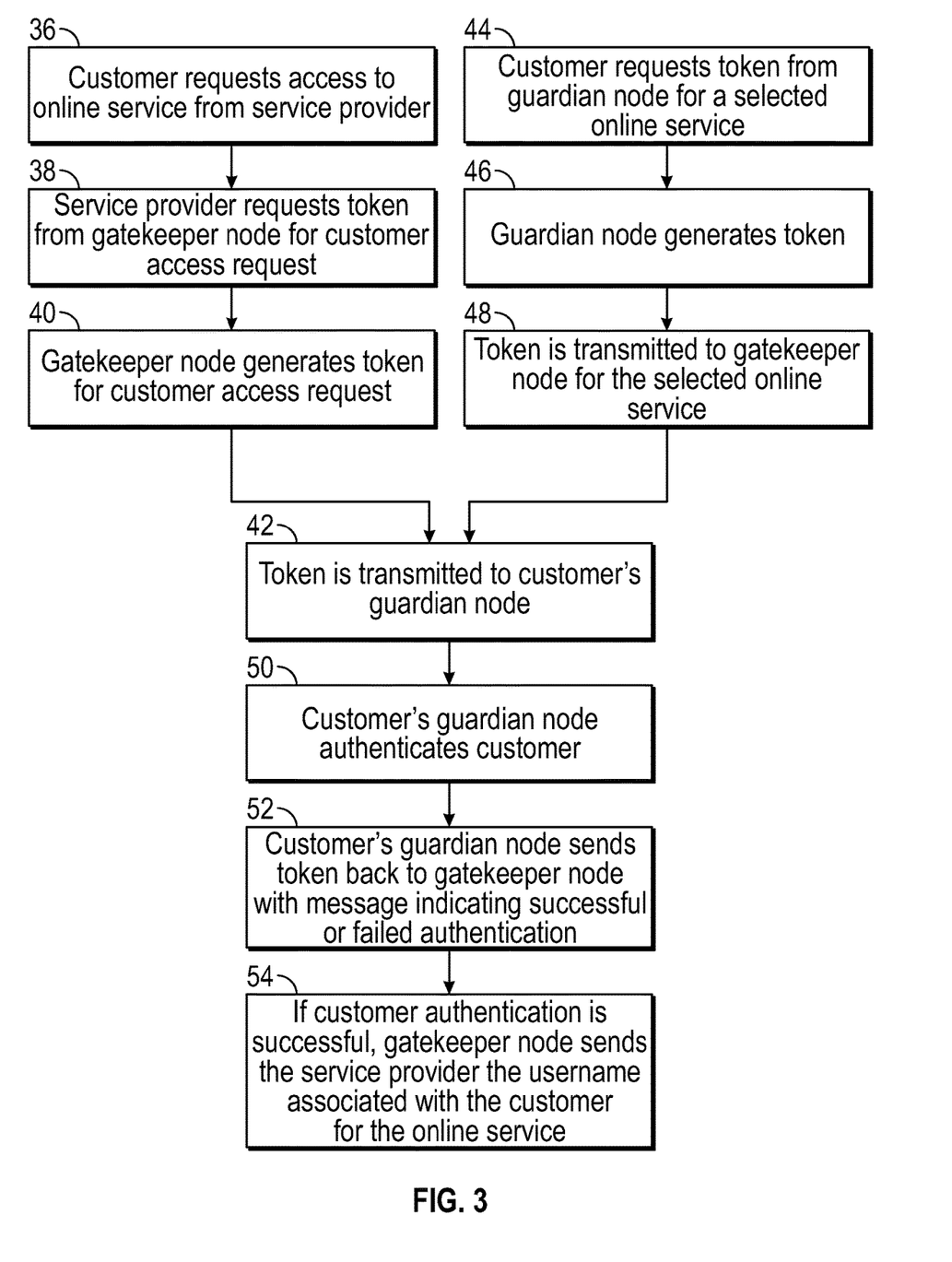
FIG. 3 is a flowchart of an exemplary operation of the UAS of FIG. 1.

FIG. 3 shows an exemplary flow diagram illustrating operation of UAS 1 to authenticate a customer 2 seeking access to an online service provided by a service provider 3. The authentication process may be initiated by a customer 2 requesting access to an online service provided by a service provider 3 at block 36. When the service provider 3 receives the request from the customer 2 for access to its online service, the service provider 3 requests a token from the Gatekeeper Node 30 of the UAS 1 with which it has its UAS provider account 32 for the customer access request at block 38. The Gatekeeper Node 30 of the UAS 1 then generates a token associated with the request for the specific request for access at block 40.

The token is a single use data object that includes a unique number, an identifier of the issuing Gatekeeper Node 30 and a session identifier that prevents replay attacks. At block 42, the token is then transmitted to the Guardian Node 20 of the customer 2 that has the customer's UAS customer account 22 in order to confirm authentication of the customer 2.

Although operation of the UAS 1 in FIG. 3 has thus far been described with the authentication process being initiated by a customer 2 requesting access to an online service provided by a service provider 3, in another example, authentication process may begin at block 44 with the customer 2 requesting a token from the Guardian Node 20 of the UAS 1 corresponding to the customer's 2 UAS customer account 22 for a selected online service provided by a service provider 3. In this instance, at block 46, the Guardian Node 20 then generates the token, which is a single use data object that includes a unique number, an identifier of the issuing Guardian Node 20 and a session identifier that prevents replay attacks. The Guardian Node 20 introduces the customer 2 to the Gatekeeper Node 30 representing the desired online service by transmitting the token to the Gatekeeper Node 30 corresponding to the service provider 3 whose online services the customer 2 wishes to access at block 48. The Gatekeeper Node 30 then sends the token back to the Guardian Node 20 that issued the token in order to confirm authentication of the customer 2 at block 42.

After the token is generated as described above (whether the token is generated by Guardian Node 20 or a Gatekeeper Node 30), the Guardian Node 20 receives the token for authentication of the customer 2 at block 42 and the Guardian Node 20 goes through the selected authentication method (e.g., multifactor authentication (MFA), Public Key Infrastructure (PKI), biometric authentication, WebAuthn, etc.) to authenticate the customer 2 at block 50. Once the customer 2 has gone through the authentication method, the Guardian Node 20 sends the token back to the Gatekeeper Node 30 with a SUCCEED/FAIL message to the Gatekeeper Node 30 at block 52. The SUCCEED/FAIL message indicates whether the customer 2 has been successfully authenticated and may include additional details such as information regarding the level security of the authentication method used in connection with the UAS customer account 22 and information regarding the amount of indemnity coverage in effect for the UAS customer account 22. If the customer 2 has been successfully authenticated, at block 54, the Gatekeeper Node 30 tells the corresponding service provider 3 which account belongs to the customer 2 by sending the service provider 3 the username associated with the service account key 34 corresponding to the customer 2 and the online service requested by the customer 2.

As discussed above, in the authentication process provided by the UAS 1, the token may be generated by either a Guardian Node 20 or a Gatekeeper Node 30. A defining property of UAS 1 is that the token is passed around the circle (Guardian Node 20, customer 2, service provider 3, Gatekeeper Node 30) and ending at the node where it was issued. This circular transmission provides for secure authentication, whereby each party appends the token to authenticate their identity before the appended token is transmitted back to the originating node and, therefore, it does not matter which node initiates the authentication procedure. Thus, the UAS 1 according to the present disclosure advantageously provides a system and method for user authentication with two security nodes, one selected by the service provider and one selected by the customer, without requiring agreement between the parties on a single authentication server.

In some embodiments of the user authentication methods described herein, the token from the Guardian Node 20 indicating that the customer 2 has been successfully authenticated sent at block 52 may be passed from the receiving Gatekeeper Node 30 to a first service provider 3, e.g., the service provider 3 for which access was initially requested, and then on to a second service provider 3. In this way the customer 2 can prove their identity to the first service provider 3 and allow the first service provider 3 to share information about the customer 3 with the second service provider 3.

In some embodiments of the user authentication methods described herein, the Gatekeeper Nodes 30 may be configured to share with the Guardian Nodes 20 tokenized versions of the public keys of the customers 2, thereby allowing the Gatekeeper Nodes 30 to detect if a particular customer 2 has created multiple accounts with a service because multiple accounts created and/or controlled by the same customer 2 are often used maliciously. Tokenization is a process of hashing a first piece of data so that the recipient, in this case the Guardian Node 20, is able to tell if that first piece of data was the same as a second piece of data without actually knowing either the first or second piece of data. Hashing is a one-way encryption function that does not allow the result to be decrypted.

In some embodiments of the UAS 1, the customers' devices maintain a data structure, such as a Merkle tree or the like, containing the customers' public keys. When a customer 2 digitally signs a token in the authentication procedures described herein, the customer 2 appends an indicator of their set of public keys, such as the root hash of the Merkle tree containing their keys, which confirms all of the customer's valid keys. In some embodiments of the present disclosure, the Guardian Nodes 20 may also maintain a data structure containing that customer's public keys, such as a Merkle tree or the like, for each customer 2 having a UAS customer account 22 with the Guardian Node 20.

In some embodiments of the user authentication methods described herein, the Guardian Nodes 20 and the Gatekeeper Nodes 30 may save the tokens from prior authentication transactions and present them to the customer 2 for verification. In this way the customer 2 can detect if a Guardian Node 20 or Gatekeeper Node 30 has performed an incorrect authentication.

Although this invention has been shown and described with respect to specific embodiments thereof, it will be understood by those skilled in the art that various changes in form and detail thereof may be made without departing from the spirit and the scope of the invention. With respect to the embodiments of the systems described herein, it will be understood by those skilled in the art that one or more system components/devices may be added, omitted or modified without departing from the spirit and the scope of the invention. With respect to the embodiments of the methods described herein, it will be understood by those skilled in the art that one or more steps may be omitted, modified or performed in a different order and that additional steps may be added without departing from the spirit and the scope of the invention.

The invention claimed is:

1. A User Authentication System (UAS) comprising:
a network of guardian nodes and gatekeeper nodes configured to securely communicate with one another;
wherein the guardian nodes are selected by UAS customers and wherein the UAS customers have their identities verified and are registered with the guardian nodes;
wherein the gatekeeper nodes are selected by service providers and wherein the service providers are registered with the gatekeeper nodes;
wherein the gatekeeper nodes receive requests for UAS customers to access online services managed by the service providers;
wherein the gatekeeper nodes generate tokens for UAS customers requesting access to online services;
wherein the guardian nodes receive the tokens from the gatekeeper nodes, authenticate the UAS customers and generate reply messages indicating whether the UAS customers requesting access to online services have been successfully authenticated;
wherein the gatekeeper nodes receive the tokens back and the reply messages indicating whether the UAS customers requesting access to online services have been successfully authenticated from the guardian nodes;
wherein the gatekeeper nodes send service providers account information regarding successfully authenticated UAS customers who have requested access to online services;
wherein each UAS customer has a registered UAS customer account maintained and stored at a guardian node; and
wherein each UAS customer account includes user account keys corresponding to different online services associated with a UAS customer.

2. The UAS according to claim 1, wherein each user account key corresponding to an online service includes a unique number and a network address of a gatekeeper node corresponding to the online service.

3. The UAS according to claim 2, wherein the gatekeeper nodes are configured to provide tokenized versions of public keys of the UAS customers to the guardian nodes; and
wherein the guardian nodes are configured to detect UAS customers with multiple UAS customer account for the same online service.

4. The UAS according to claim 2, wherein each UAS customer account includes a data structure comprising public keys associated with a UAS customer.

5. The UAS according to claim 1, wherein each UAS customer has at least one user device, each user device including a data structure comprising a set of public keys associated with the UAS customer.

6. The UAS according to claim 5, wherein authentication of the UAS customer includes appending an indicator of the set of public keys associated with the UAS customer to the token to confirm all valid keys associated with the UAS customer.

7. The UAS according to claim 1, wherein the at least one of the guardian nodes or the gatekeeper nodes is configured to save tokens from prior authentications and to provide the saved tokens to the UAS customers for verification of correct authentication.

8. The UAS according to claim 1, wherein the guardian nodes authenticate UAS customers using an authentication method selected from the group consisting of multifactor authentication (MFA), Public Key Infrastructure (PKI) biometric authentication, biometric authentication and WebAuthn.

9. The UAS according to claim 1, wherein each service provider has a registered UAS provider account maintained and stored at a gatekeeper node.

10. The UAS according to claim 9, wherein each UAS provider account includes service account keys corresponding to different UAS customers who access an online service managed by the service provider.

11. The UAS according to claim 10, wherein each service account key corresponding to a UAS customer includes a unique number and a username.

12. The UAS according to claim 1, further comprising an executive node configured to securely communicate with the guardian nodes and gatekeeper nodes;
wherein the executive node stores public keys, and the guardian nodes and gatekeeper nodes store private keys; and
wherein the public keys and private keys are used for secure communication among the executive node, guardian nodes and gatekeeper nodes.

13. The UAS according to claim 12, wherein the executive node includes a table of authentic guardian nodes and gatekeeper nodes in the UAS, which includes the network addresses of the authentic guardian nodes and gatekeeper nodes, the UAS customers associated with each guardian node and the online services associated with each gatekeeper node.

14. The UAS according to claim 1, further comprising an executive node configured to securely communicate with the guardian nodes and gatekeeper nodes;
wherein the executive node stores a table of network addresses of the guardian nodes and the gatekeeper nodes in the UAS; and
wherein the executive node periodically shares the table of network addresses with the guardian nodes and the gatekeeper nodes.

15. The UAS according to claim 1, wherein the guardian nodes receive the tokens directly and/or without further processing from the gatekeeper nodes, and the gatekeeper nodes receive the tokens directly and/or without further processing from the guardian nodes.

16. A method of providing user authentication across system boundaries, including the steps of:
a gatekeeper node which is selected by a service provider, wherein the service provider is registered with the gatekeeper node, receiving a request for a UAS customer to access an online service managed by a service provider;
the gatekeeper node generating a token for the UAS customer request to access the online service;
a guardian node which is selected by a UAS customer, wherein the UAS customer has his identity verified and is registered with the guardian node, receiving the token from the gatekeeper node and authenticating the UAS customer;
the guardian node generating a reply message indicating whether the UAS customer has been successfully authenticated;
the gatekeeper node receiving the token back and the reply message indicating whether the UAS customer has been successfully authenticated from the guardian node;
the gatekeeper node sending the service provider account information for the successfully authenticated UAS customer who has requested access to the online service;

further comprising the step of:
the guardian node registering and storing a UAS customer account for the UAS customer; and
wherein the UAS customer account includes a user account key corresponding to the UAS customer and the requested online service.

17. The method according to claim 16, wherein the user account key includes a unique number and a network address of the gatekeeper node corresponding to the online service.

18. The method according to claim 16, wherein the guardian node authenticates the UAS customer using an authentication method selected from the group consisting of multifactor authentication (MFA), Public Key Infrastructure (PKI), biometric authentication and WebAuthn.

19. The method according to claim 16, further comprising the step of:
the gatekeeper node registering and storing a UAS provider account for the service provider.

20. The method according to claim 19, wherein the UAS provider account includes a service account key corresponding to the UAS customer and the requested online service.

21. The method according to claim 20, wherein the service account key includes a unique number and a username.

22. The method according to claim 16, further comprising the steps of:
an executive node securely communicating with the guardian nodes and gatekeeper nodes;
the executive node storing public keys, and the guardian nodes and gatekeeper nodes storing private keys; and
the executive node, guardian nodes and gatekeeper nodes using the public keys and private keys for securely communicating with each other.

23. The method according to claim 22, further comprising the step of:
the executive node storing a table including the network address of the guardian node associated with the UAS customer and the gatekeeper node associated with the online service.

24. The method according to claim 16, further comprising the step of:
the service provider sending the account information for the successfully authenticated UAS customer on to a second service provider.

25. A User Authentication System (UAS) comprising:
a network of guardian nodes and gatekeeper nodes configured to securely communicate with one another;
wherein the guardian nodes are selected by UAS customers and wherein the UAS customers have their identities verified and are registered with the guardian nodes;
wherein the gatekeeper nodes are selected by service providers and wherein the service providers are registered with the gatekeeper nodes;
wherein the gatekeeper nodes receive tokens associated with requests for UAS customers to access online services managed by the service providers;
wherein the gatekeeper nodes send the tokens to the guardian nodes corresponding to the UAS customers requesting access;
wherein the guardian nodes receive the tokens from the gatekeeper nodes, authenticate the UAS customers and generate reply messages indicating whether the UAS customers requesting access to online services have been successfully authenticated;
wherein the gatekeeper nodes receive the tokens back and the reply messages indicating whether the UAS customers requesting access to online services have been successfully authenticated from the guardian nodes;

wherein the gatekeeper nodes send service providers account information regarding successfully authenticated UAS customers who have requested access to online services;

wherein each UAS customer has a registered UAS customer account maintained and stored at a guardian node; and wherein each UAS customer account includes user account keys corresponding to different online services associated with a UAS customer.

26. The UAS according to claim 25, wherein each user account key corresponding to an online service includes a unique number and a network address of a gatekeeper node corresponding to the online service.

27. The UAS according to claim 25, wherein the guardian nodes authenticate UAS customers using an authentication method selected from the group consisting of multifactor authentication (MFA), Public Key Infrastructure (PKI), biometric authentication and WebAuthn.

28. The UAS according to claim 25, wherein each service provider has a registered UAS provider account maintained and stored at a gatekeeper node.

29. The UAS according to claim 28, wherein each UAS provider account includes service account keys corresponding to different UAS customers who access an online service managed by the service provider.

30. The UAS according to claim 29, wherein each service account key corresponding to a UAS customer includes a unique number and a username.

31. The UAS according to claim 25, further comprising an executive node configured to securely communicate with the guardian nodes and gatekeeper nodes;

wherein the executive node stores public keys, and the guardian nodes and gatekeeper nodes store private keys; and wherein the public keys and private keys are used for secure communication among the executive node, guardian nodes and gatekeeper nodes.

32. The UAS according to claim 31, wherein the executive node includes a table of authentic guardian nodes and gatekeeper nodes in the UAS, which includes the network addresses of the authentic guardian nodes and gatekeeper nodes, the UAS customers associated with each guardian node and the online services associated with each gatekeeper node.

33. A method of providing user authentication across system boundaries, including the steps of:

a gatekeeper node which is selected by a service provider, wherein the service provider is registered with the gatekeeper node, receiving a token associated with a request for a UAS customer to access an online service managed by a service provider;

the gatekeeper node sending the token to a guardian node corresponding to the UAS customer requesting access;

the guardian node which is selected by a UAS customer, wherein the UAS customer has his identity verified and is registered with the guardian node, receiving the token from the gatekeeper node and authenticating the UAS customer;

the guardian node generating a reply message indicating whether the UAS customer has been successfully authenticated;

the gatekeeper node receiving the token back and the reply message indicating whether the UAS customer has been successfully authenticated from the guardian node;

the gatekeeper node sending the service provider account information for the successfully authenticated UAS customer who has requested access to the online service;

further comprising the step of:

the guardian node registering and storing a UAS customer account for the UAS customer; and wherein the UAS customer account includes a user account key corresponding to the UAS customer and the requested online service.

34. The method according to claim 33, wherein the user account key includes a unique number and a network address of the gatekeeper node corresponding to the online service.

35. The method according to claim 33, wherein the guardian node authenticates the UAS customer using an authentication method selected from the group consisting of multifactor authentication (MFA), Public Key Infrastructure (PKI), biometric authentication and WebAuthn.

36. The method according to claim 33, further comprising the step of:

the gatekeeper node registering and storing a UAS provider account for the service provider.

37. The method according to claim 36, wherein the UAS provider account includes a service account key corresponding to the UAS customer and the requested online service.

38. The method according to claim 37, wherein the service account key includes a unique number and a username.

39. The method according to claim 33, further comprising the steps of:

an executive node securely communicating with the guardian nodes and gatekeeper nodes;

the executive node storing public keys, and the guardian nodes and gatekeeper nodes storing private keys; and the executive node, guardian nodes and gatekeeper nodes using the public keys and private keys for securely communicating with each other.

40. The method according to claim 39, further comprising the step of:

the executive node storing a table including the network address of the guardian node associated with the UAS customer and the gatekeeper node associated with the online service.

* * * * *